United States Patent
Sanocki et al.

(10) Patent No.: US 8,029,643 B2
(45) Date of Patent: Oct. 4, 2011

(54) APPARATUS AND METHOD FOR REMOVING A TEMPORARY SUBSTRATE FROM AN OPTICAL DISK

(75) Inventors: Dan Jay Sanocki, Camarillo, CA (US); Bang Thai Dinh, Simi Valley, CA (US); Brandon Lu, Alhambra, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 1077 days.

(21) Appl. No.: 11/884,905

(22) PCT Filed: Mar. 4, 2005

(86) PCT No.: PCT/US2005/007080
§ 371 (c)(1),
(2), (4) Date: Aug. 22, 2007

(87) PCT Pub. No.: WO2006/096165
PCT Pub. Date: Sep. 14, 2006

(65) Prior Publication Data
US 2008/0156439 A1 Jul. 3, 2008

(51) Int. Cl.
*B32B 38/10* (2006.01)

(52) U.S. Cl. ........ 156/716; 156/765; 156/926; 156/928; 29/426.6

(58) Field of Classification Search .......... 156/247, 156/344, 584, 716, 765, 926, 938; 29/426.4, 29/426.6
See application file for complete search history.

(56) References Cited

U.S. PATENT DOCUMENTS

| | | |
|---|---|---|
| 3,266,797 A | 8/1966 | Stievenart |
| 3,547,744 A | 12/1970 | Buchaklian, Jr. |
| 4,944,837 A | 7/1990 | Nishikawa et al. |
| 5,240,546 A | 8/1993 | Shiga |
| 5,300,170 A * | 4/1994 | Donohoe ............ 156/235 |
| 5,378,516 A | 1/1995 | Arahara |
| 5,879,505 A | 3/1999 | Fujisawa et al. |
| 5,972,159 A | 10/1999 | Uryu et al. |
| 6,117,284 A | 9/2000 | Mueller |
| 6,277,234 B1 | 8/2001 | Freund et al. |
| 6,569,259 B1 | 5/2003 | Kagawa |
| 6,698,486 B2 | 3/2004 | Goh |
| 6,746,564 B2 * | 6/2004 | Fujisaku et al. ............ 156/344 |
| 6,827,813 B2 | 12/2004 | Kitano et al. |
| 6,966,966 B2 | 11/2005 | Koizumi et al. |
| 2003/0098131 A1 | 5/2003 | Hayasaka et al. |
| 2009/0025875 A1 * | 1/2009 | Hagman ............ 156/344 |

FOREIGN PATENT DOCUMENTS

| | | |
|---|---|---|
| JP | 62-189642 | 8/1987 |
| JP | 1-220828 | 9/1989 |
| JP | 5-109121 | 4/1993 |
| WO | WO 00/18531 | 4/2000 |
| WO | WO 00/48178 | 8/2000 |
| WO | WO 01/49482 | 7/2001 |

OTHER PUBLICATIONS

Search Report Dated Mar. 2, 2006.

* cited by examiner

*Primary Examiner* — Mark A Osele
(74) *Attorney, Agent, or Firm* — Robert D. Shedd; Robert B. Levy; Jeffrey D. Hale

(57) ABSTRACT

An apparatus and method for removing a temporary substrate from an optical disk is disclosed. A holding fixture (102) provides an optical disk supporting surface. A force imparting tool (118) imparts a force against an optical disk wherein a reaction force to the force imparting tool is provided by the supporting surface. The optical disk is flexed to break away and remove a temporary substrate of the optical disk.

10 Claims, 4 Drawing Sheets

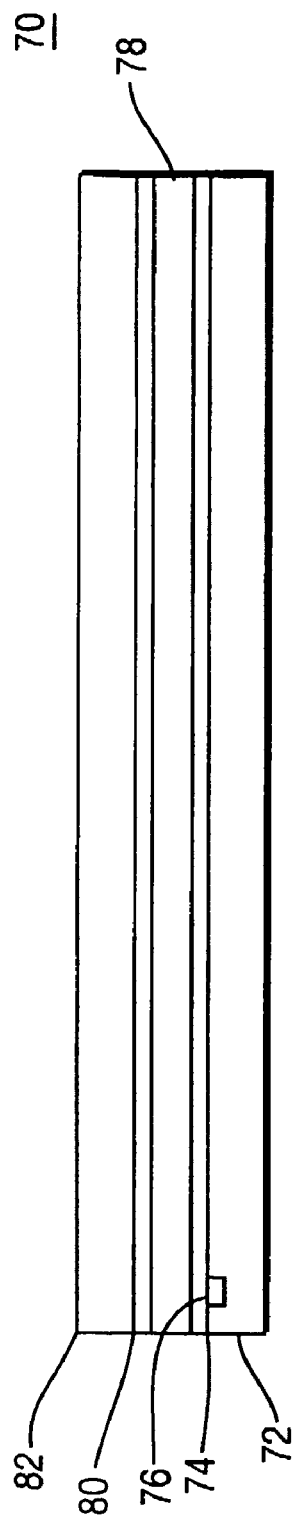
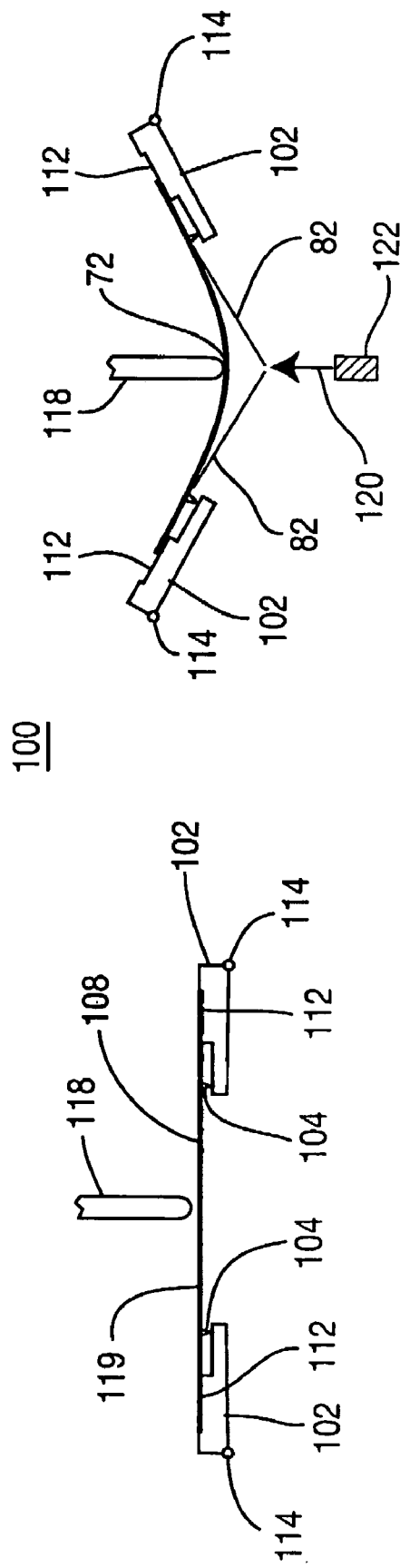
FIG. 2
FIG. 3
FIG. 4

APPARATUS AND METHOD FOR REMOVING A TEMPORARY SUBSTRATE FROM AN OPTICAL DISK

This application claims the benefit, under 35 U.S.C. §365 of International Application PCT/US2005/007080, filed Mar. 4, 2005, which was published in accordance with PCT Article 21(2) on Sep. 14, 2006 in English.

FIELD OF THE INVENTION

The present invention generally relates to manufacturing optical disks such as compact disks (CDs) and digital video disks (DVDs) and, more particularly, to an apparatus and method for removing a temporary substrate from an optical disk to improve manufacturing yield and operating conditions.

BACKGROUND OF THE INVENTION

Digital disks such as compact disks (CDs) or digital versatile disks (DVDs) may include a multiple layer process for manufacture. The disk may include a substrate having a pattern of microscopic pits or readout information applied thereto. The pattern of pits includes the digital readout information for the disk. The substrate may have one or more layers applied to it. The readout surface may have a metal applied to the surface using a surface transfer process (STP). The surface transfer process includes producing a single or dual-layer readout surface that includes a sputtered-on reflective (e.g., aluminum) layer on a temporary substrate. The temporary substrate may include polymethylmethacralate (PMMA). The metallized layer portion, which includes the metal and the temporary substrate, is transferred to the already-molded readout layer (with the readout information) having a lacquer layer formed thereon. The PMMA temporary substrate is bonded to the lacquer then, the PMMA temporary substrate is removed from the metallized portion.

Removal of the temporary substrate may be performed by a stripping procedure that typically includes three steps. In the first step, a mechanical device with a knife-edge is inserted between the two half disks at the inside diameter to force separation between the two disks. Next, air pressure is applied in the separation area to propagate the separation. Finally suction cups are employed on the top and bottom surfaces of the disk to pull the halves apart. The temporary substrate is then discarded.

This technique has several significant drawbacks. In the conventional mechanical stripping process, alignment of the knife edge to the inside diameter is critical. The mechanical stripping process described above also creates dust and debris, which may result in reduced product quality. Disks with lacquer or other materials in their moat (edge) area are difficult to separate using the conventional mechanical stripping technique. In addition, the reliability of the temporary substrate removal process often suffers from reliability problems due to surface defects in the metalization layer as a result of the stripping process.

SUMMARY OF THE INVENTION

An apparatus and method for removing a temporary substrate from an optical disk is disclosed. A holding fixture provides an optical disk supporting surface. A force-imparting tool imparts a force against an optical disk wherein a reaction force to the force-imparting tool is provided by the supporting surface. A scoring device, which allows for easier breakage of the temporary substrate may be employed. The optical disk is flexed to break away and remove a temporary substrate of the optical disk.

BRIEF DESCRIPTION OF THE DRAWINGS

The advantages, nature, and various additional features of the invention will appear more fully upon consideration of the illustrative embodiments now to be described in detail in connection with accompanying drawings wherein:

FIG. 2 is a cross-sectional view of a preassembly having a temporary substrate to be removed;

FIGS. 3 and 4 are diagrams showing positions for bending a preassembly in the apparatus for removing a temporary substrate from an optical disk in accordance with one illustrative embodiment;

It should be understood that the drawings are for purposes of illustrating the concepts of the invention and are not necessarily the only possible configuration for illustrating the invention.

DETAILED DESCRIPTION OF THE INVENTION

The present invention provides a method and apparatus for removing a temporary substrate from a disk during a surface transfer process. An assembled disk having a temporary substrate attached thereon is flexed with pressure being applied on an opposite side of the temporary substrate. The pressure is preferably applied along a centerline of the disk until the temporary substrate breaks into two pieces. After breaking the temporary substrate, the temporary substrate can easily be removed and discarded.

It is to be understood that the present invention is described in terms of a DVD manufacturing process and system; however, the present invention is much broader and may include any optical disk manufacturing process including compact disks, laser disks, etc. In addition, the present invention is applicable to any surface transfer process that employs a temporary substrate.

It should be understood that the elements shown in the FIGS. may be implemented in various forms of hardware, software or combinations thereof. Preferably, these elements are implemented in hardware controlled manually or by one or more appropriately programmed general-purpose devices, which may include a processor, memory and input/output interfaces. One skilled in the art with knowledge of the present disclosure would understand that different mechanical configurations/setups and variations may be employed for achieving the desired results.

Figure 1:
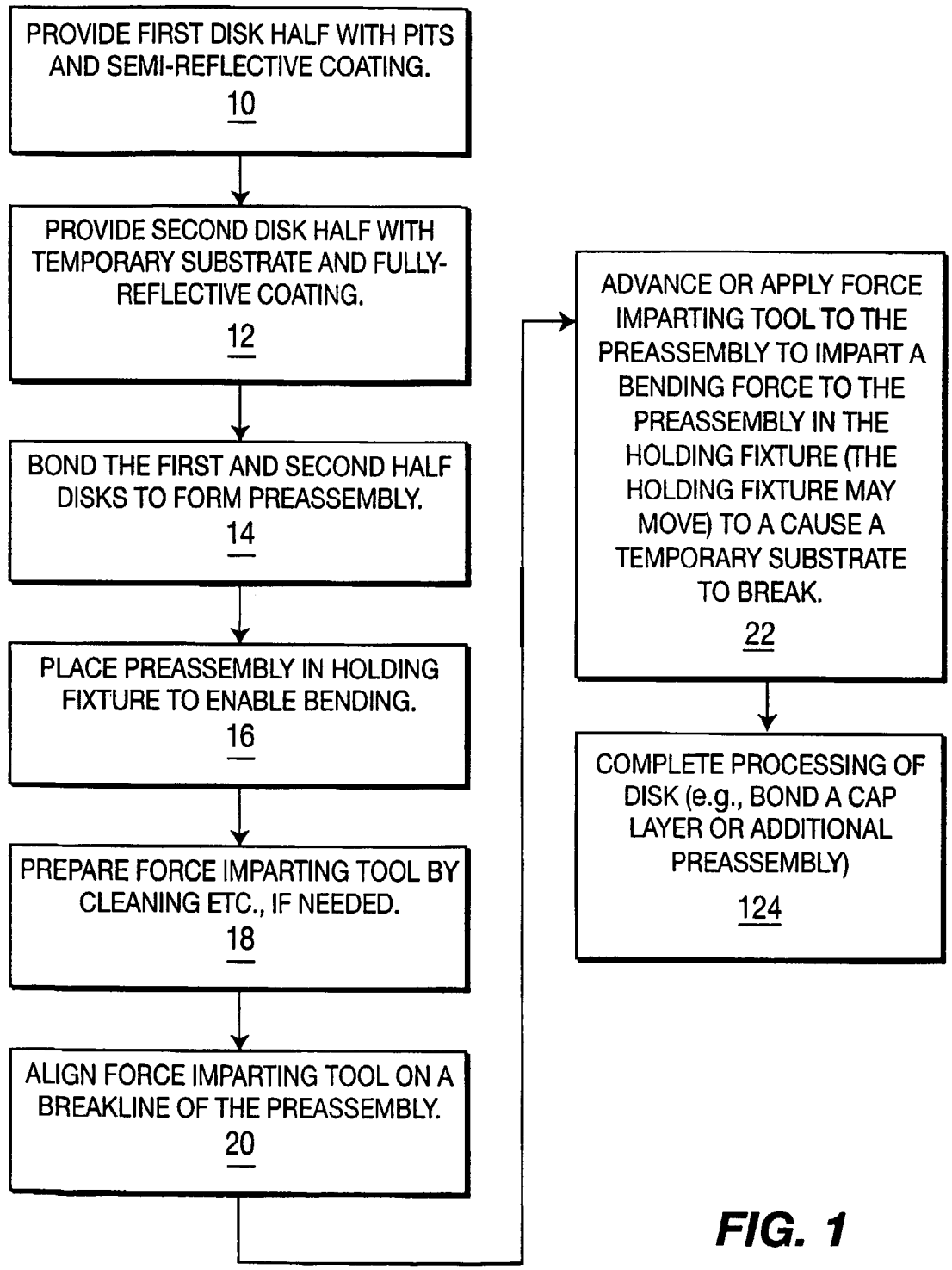
FIG. 1 is a flow diagram showing a method for removing a temporary substrate from an optical disk in accordance with an illustrative embodiment.

Referring now in specific detail to the drawings in which like reference numerals identify similar or identical elements throughout the several views, and initially to FIG. 1, a flow diagram is presented describing method steps for removing a temporary substrate for a surface transfer process in optical disk manufacturing. In block 10, upstream manufacturing provides a first half disk, which includes pits or data thereon or therein. In one embodiment, the first half disk includes a semi-reflective coating over the pits. The first half-disk may include polycarbonate or other plastic material.

In block 12, a second half disk includes a temporary substrate, which may include a fully-reflective coating over pits of data. The fully reflective coating may include a metallic layer, such as, for example, aluminum. In block 14, the first and second halves are brought together and bonded. The semi-reflective layer side of the first half and the reflective layer of the second half are bonded through use of an adhesive or bonding layer, such as, for example, lacquer. In one embodiment, the lacquer includes a thickness of between about 40 and 70 microns. The adhesive of lacquer forms a spacer layer between the reflective and semi-reflective layers. The spacer layer holds the first and second halves together and forms an optical path that permits data at the fully reflective layer to be read through the semi-reflective layer. The first and second halves bonded together will be referred to as a preassembly.

FIG. 2 shows an illustrative layer stack in accordance with one useful embodiment. Preassembly 70 includes a first half layer 72 formed from a plastic, such as polycarbonate. Layer 72 includes a semi-reflective coating 74 over pits 76. A lacquer coating 78 is formed over the semi-reflective coating 74. Lacquer 78 bonds coating 74 to a fully reflective coating 80. Fully reflective coating 80 may include aluminum formed on a temporary substrate 82.

Referring again to FIG. 1, in block 16, the preassembly is placed in a fixture or anvil for the removal of the temporary substrate portion of the second half. The fixture may include a plurality of different features, which provide for a clean and predictable flexure of the preassembly. In one embodiment, the preassembly is held at an exterior periphery using suction cups of other non-marring securing devices. These securing devices are preferably located on a same side of the preassembly and diametrically opposed.

A force-imparting tool may include one or more end rods, or a rounded or pointed end plate that imparts a force against a portion of the preassembly, preferably along a line where a break is desired. The force-imparting tool is preferably made of a material that includes the same or softer hardness than the disk material. Force imparting tool may include polycarbonate, polytetraflouroethylene (PTFE) or other plastic material. Alternately, the force-imparting tool may include a more rigid material (e.g., aluminum) and be configured to include a lining or end portion having a same or softer material. The force-imparting tool should be free from dirt or debris, as should the surface of the preassembly to prevent damage in block 18.

In block 20, the force-imparting tool is aligned along the desired break line of the temporary substrate to be removed. In block 22, the force-imparting tool is advanced to cause a controlled bending in the preassembly. The force-imparting tool engages the first half disk side and forces the temporary substrate of the second half disk to break.

To enhance the controlled bending, portions of the holding fixture or anvil, which secure the preassembly, rotate in accordance with the bending force applied to the preassembly by the force-imparting tool. In one embodiment, portions of the anvil, which connect to the second half provide a motion that advances the temporary substrate toward the break line of the temporary substrate. This assists in the efficiency of the break, the transfer of the reflective surface to the lacquer and the removal of the temporary substrate from the remaining portions of the preassembly.

It is to be understood that the flexure of the preassembly creates sufficient bending stress in the temporary substrate to crack it and break adhesion with the fully reflective layer, but is within the elastic range of flexure for the lacquer and first half disk layers (e.g., no plastic deformation or permanent damage to these layers). In block 24, a cap layer or another preassembly (with the temporary substrate removed) may be applied to the fully reflective surface of the preassembly. The cap layer provides a one layer data readout disk. When two preassemblies are combined a two layered data readout disk is provided, which may be the same size as the single layer disk. Rebonding of the disk portions is then performed.

Referring to FIG. 3, an apparatus 100 for removing a temporary substrate carrying a layer to be transferred by a surface transfer process is illustratively shown. Apparatus 100 includes anvil portions 102, each including at least one securing mechanism 104. Securing mechanisms 104 are illustratively shown having suctions cups 104 (see locations 124 and 126 in FIGS. 5-7), which may include vacuum holes (not shown) to maintain suction therein. Mechanisms 104 may include non-marring clamps or other devices as well. If suction cups are employed for mechanisms 104, the vacuum holes may communicate with vacuum lines, which are in turn in communication with a vacuum pump (not shown). Alternately, the suction cups may be employed without a vacuum connection.

Securing mechanisms 104 are preferably positioned on a same diametrical line on opposite sides of a centerline of a disk preassembly 108 or opposite sides of a center hole of a disk preassembly 108. Securing mechanisms 104 may be arranged in other operational configurations as well. Anvil portions 102 may include a recess 112, which receives the thickness of a disk preassembly 108 and assists in proper alignment of the disk preassembly 108 on anvil 102.

Referring to FIGS. 3 and 4, anvil portions 102 preferably include a pivot 114 about which rotation of the anvil portion 102 is permitted. During the flexure of the preassembly 108, these anvil portions 102 will accommodate flexure to provide a more severe bending, which in turn increases the amount of stress on a temporary substrate to ensure a crack forms and propagates across the preassembly 108. In addition, by pivoting anvil portions 102 a shear force/stress is developed between layers of preassembly 108. This shearing assists in the removal of the temporary substrate of the preassembly 108.

A force-imparting tool 118 includes a rod, plate or other structure for imparting a force against preassembly 108. The force is applied to a surface opposite the temporary substrate layer to be removed. Tool 118 preferably includes a material that is softer than a surface material 119 of preassembly to which it contacts. Pads or other protective coverings may be employed between the tool 118 and the surface 119.

Anvil portions 102 are biased against the motion caused by tool 118. This may be provided by a spring or other biasing means (not shown). The horizontal position (disk laying flat) is the default position for the anvil portions 102.

In another embodiment, the temporary substrate (82) may be scored by a cutting tool or knife to provide a predetermined break line for the temporary substrate. One or more rods having a diameter of, e.g., between about 4 mm to 10 mm in diameter and radiused at the end may be employed for tool 118.

Figure 6:
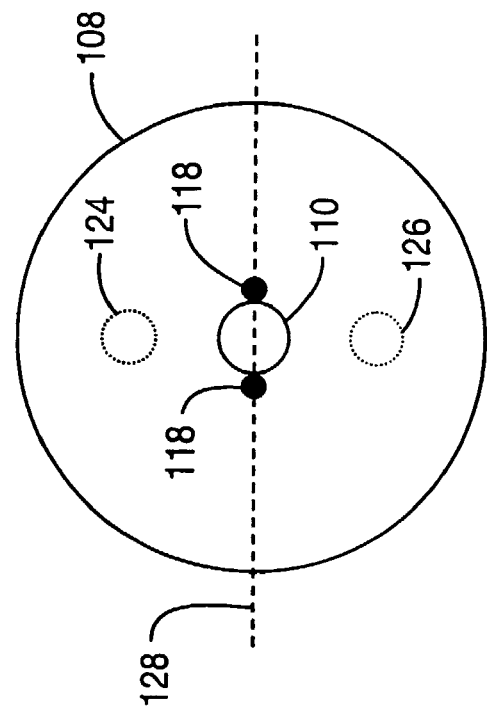
FIGS. 5, 6 and 7 are diagrams showing different force imparting tool configurations in accordance with illustrative embodiments.
Figure 7:
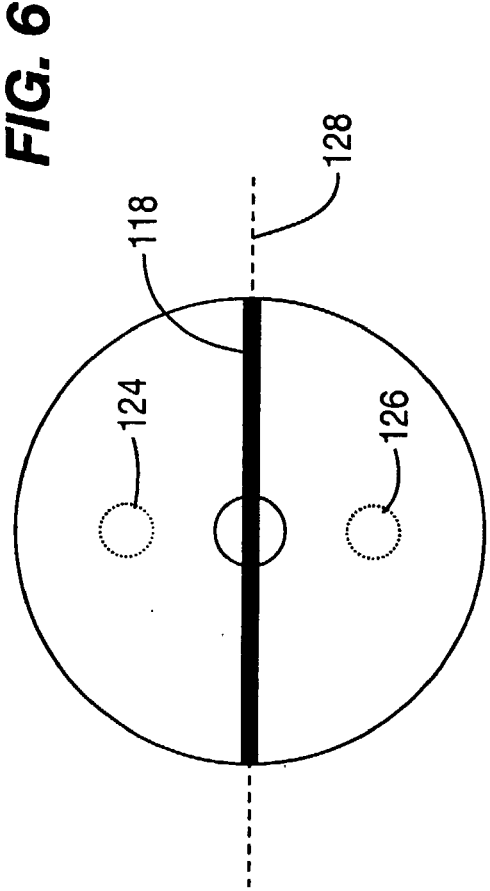
Figure 5:
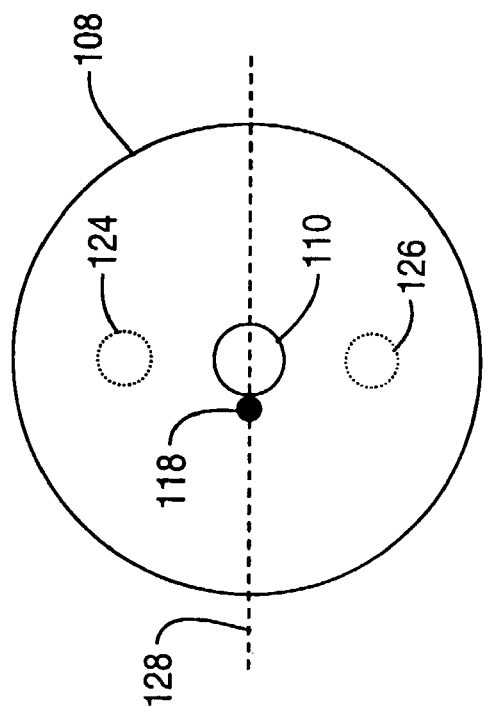

FIGS. 5, 6 and 7 show different configurations for tool 118. FIG. 4 shows tool 118 contacting preassembly 108 (or preassembly 70 in FIG. 2) at or near the center hole 110. Suction cup locations 124 and 126 are shown. FIG. 5 provides for a plurality of tools 118 which are disposed along a break line 128. FIG. 6 shows tool 118 as a plate disposed along break line 128. The suction cup positions 124 and 126 may be disposed at different locations than those depicted. For example, the suction cup positions 124 and 126 may be located further from the center hole 110.

Referring again to FIG. 4, tool 118 is moved to engage and bend preassembly 108 as indicated. In one embodiment, pressurized gas 120 may be provided by a nozzle 122 to cause delamination and move the temporary substrate out of the way. Once the temporary substrate 82 is broken away, tool 118 is retracted and the preassembly returns to its flat state for further processing. Tool 118 may be coupled to an actuator or other device, which provides an advancing and retracting motion for tool 118.

Figure 8:
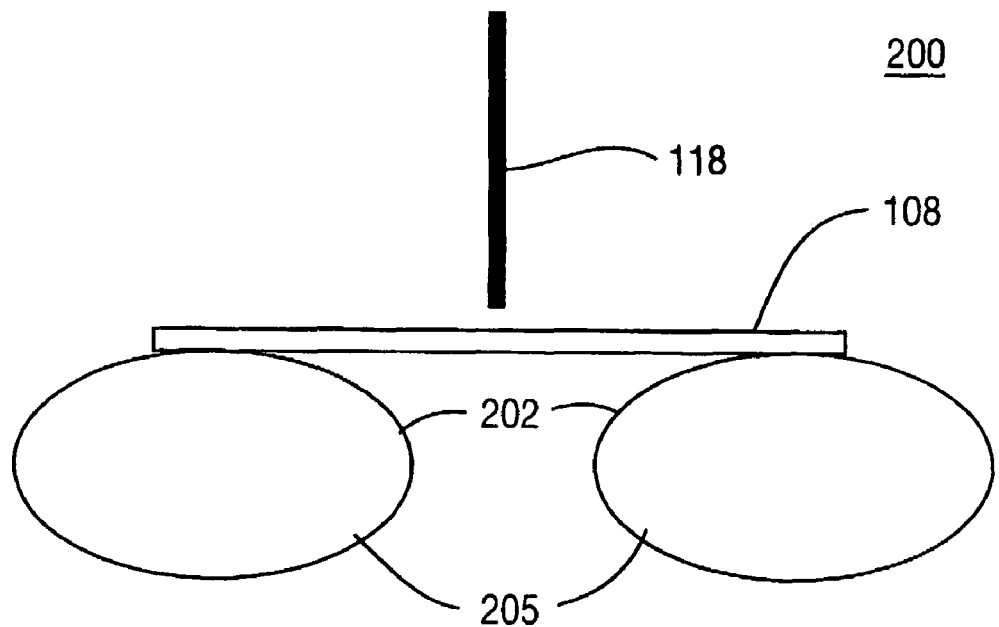
FIGS. 8 and 9 are diagrams showing positions for bending a preassembly in the apparatus for removing a temporary substrate from an optical disk in accordance with another illustrative embodiment.
Figure 9:
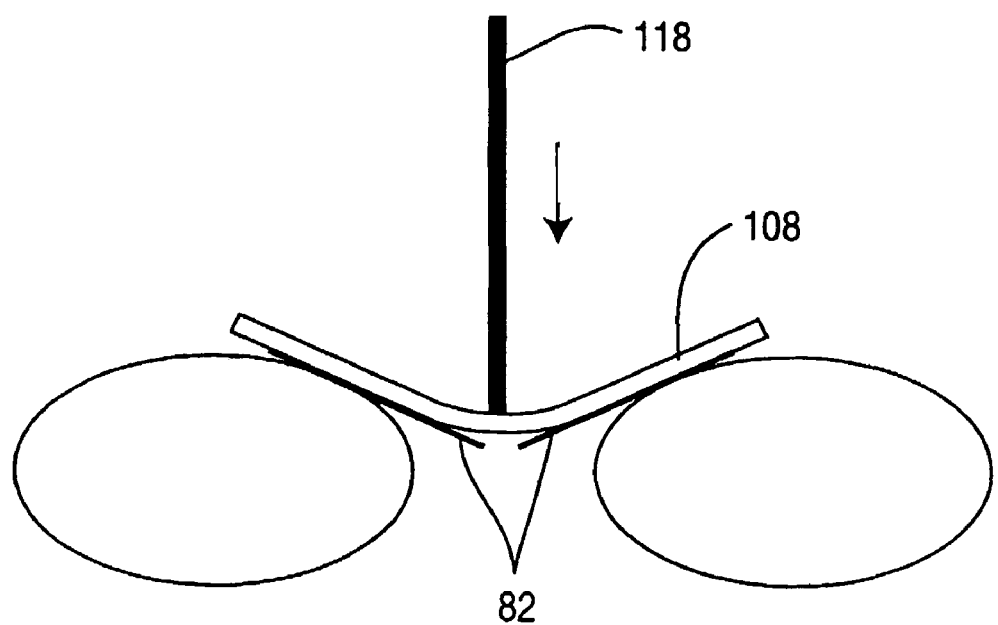

Referring to FIGS. 8 and 9, an alternate apparatus 200 includes a fixture 205, which provides arcuate surfaces 202. These surfaces 202 replace the need to include pivots 114. Instead, fixture 205 remains stationary during the removal of the temporary substrate 82. Surfaces 202 may be provided by cylindrical rods or include elliptical cross-sections or the like. As preassembly 108 flexes, the preassembly engages a different portion of surface 202 until a crack develops and the temporary substrate 82 breaks away. Surface 202 preferably provides a low coefficient of friction against the temporary substrate 82. Surfaces 202 may include a material such as PTFE or other materials.

Having described preferred embodiments for an apparatus and method for removing a temporary substrate from an optical disk (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. An apparatus for removing a temporary substrate from an optical disk, comprising:
   a holding fixture which provides an optical disk supporting surface that includes suction cups for securing an optical disk; and
   a force-imparting tool, which imparts a force against a fixed contact region of an optical disk wherein, a reaction force to the force-imparting tool is provided by the supporting surface such that the optical disk is flexed to break away and remove a temporary substrate of the optical disk.

2. The apparatus as recited in claim 1, wherein the supporting surface includes arcuate surfaces which provide an appropriate deflection of an optical disk to break away and remove a temporary substrate of the optical disk.

3. An apparatus for removing a temporary substrate from an optical disk preassembly, comprising:
   a holding fixture which provides an optical disk supporting surface that includes suction cups for securing an optical disk, the holding fixture including anvil portions which support diametrically opposing end portions on a same side of the optical disk preassembly, the anvil portions each including a pivot; and
   a force imparting tool which imparts a force against an optical disk preassembly such that the anvil portions rotate about their respective pivot to cause the optical disk preassembly to be flexed to break away and remove a temporary substrate of the optical disk.

4. An apparatus for removing a temporary substrate from an optical disk preassembly, comprising:
   a holding fixture which provides an optical disk supporting surface, the holding fixture including anvil portions which support diametrically opposing end portions on a same side of the optical disk preassembly, the anvil portions each including a pivot; and
   a force imparting tool, including a plate, which imparts a force against an optical disk preassembly such that the anvil portions rotate about their respective pivot to cause the optical disk preassembly to be flexed to break away and remove a temporary substrate of the optical disk.

5. An apparatus for removing a temporary substrate from an optical disk preassembly, comprising:
   a holding fixture which provides an optical disk supporting surface which includes recesses to alignment of an optical disk preassembly, the holding fixture including anvil portions which support diametrically opposing end portions on a same side of the optical disk preassembly, the anvil portions each including a pivot; and
   a force imparting tool which imparts a force against an optical disk preassembly such that the anvil portions rotate about their respective pivot to cause the optical disk preassembly to be flexed to break away and remove a temporary substrate of the optical disk.

6. A method for removing a temporary substrate from an optical disk preassembly, comprising the steps of:
   bonding two half discs with a bonding material to form an optical disk preassembly;
   placing the preassembly in a holding fixture;
   imparting a force to a side of the disk opposite from a temporary substrate which is to be removed to flex and break the temporary substrate without permanent damage to other portions of the preassembly;
   forming an optical disk from the preassembly without the temporary substrate.

7. The method as recited in claim 6, wherein the step of imparting a force includes imparting the force at a centermost portion of the preassembly.

8. The method as recited in claim 6, wherein the step of placing includes securing the preassembly is the holding fixture using suction cups.

9. The method as recited in claim 6, wherein the force imparting tool includes a rod or plate, and the step of imparting a force further comprises imparting a force that acts substantially at a center of an optical disk preassembly wherein the holding fixture includes two securing mechanisms connected to a side of the disk opposite the force imparting tool and diametrical opposed to each other.

10. The method as recited in claim 6, wherein the step of imparting includes the step of pivoting portion of the holding fixture to assist in breaking and removing the temporary substrate.

* * * * *